Feb. 6, 1962 R. E. SHAFER 3,020,450

MOUNTING FOR ELECTRICAL ELEMENTS

Filed June 30, 1958 3 Sheets-Sheet 1

INVENTOR.
RICHARD E. SHAFER
BY
[signature]
ATTORNEY

INVENTOR.
RICHARD E. SHAFER
BY
[signature]
ATTORNEY

Feb. 6, 1962 R. E. SHAFER 3,020,450

MOUNTING FOR ELECTRICAL ELEMENTS

Filed June 30, 1958 3 Sheets-Sheet 3

INVENTOR.
RICHARD E. SHAFER
BY
[signature]
ATTORNEY

1

3,020,450
MOUNTING FOR ELECTRICAL ELEMENTS

Richard E. Shafer, Pasadena, Calif., assignor to Radio Corporation of America, a corporation of Delaware Filed June 30, 1958, Ser. No. 745,352
14 Claims. (Cl. 317—99)

This invention relates to mountings for electrical elements and associated components, and particularly to a mounting for electronic components subject to extreme vibration and intense heat.

In the construction of electronic units to be airborne in aircraft and missiles, the elements of the units are mounted in frames and interconnected in accordance with the circuitry of the system. The present invention is directed to a mounting construction for a plurality of electrical components, such as condensers, transformers, tubes, and other electrical parts, which has many advantages over previous types of mountings. For instance, the mounting to be described hereinafter provides the maximum effective utilization of the internal volume available in aircraft and missiles commensurate with high reliability. The mounting is light in weight for a certain required performance, reduces the number of connectors to a minimum, provides improved interchangeability of the units, provides smaller packages or circuit divisions which may be tuned, adjusted, and replaced easily, provides easy accessibility for tests and servicing, and is economical to produce and lends itself to low assembly labor costs. It is well known that in missiles and jet aircraft, considerable electronic gear is required. The present invention is adapted to provide the above advantages which are desirable for electrical units for this type of use.

The principal object of the invention, therefore, is to facilitate the mounting or packaging of electronic equipment subject to excessive vibration and heat encountered in high speed aircraft and missiles.

Another object of the invention is to provide a mounting frame which permits the interconnection of the necessary electrical elements within a minimum of space and at minimum cost.

A further object of the invention is to provide electrically operating chassis which may be hinged for servicing without electrically disconnecting the chassis.

A still further object of the invention is to provide a frame which may be suitable for use with other similar frames and which may have mounted thereon the necessary electrical elements to provide a complete electrical system within a minimum space with maximum reliability.

A better understanding of this invention may be had from the following detailed description when read in connection with the accompanying drawings, in which.

Figures 1, 2, 3:
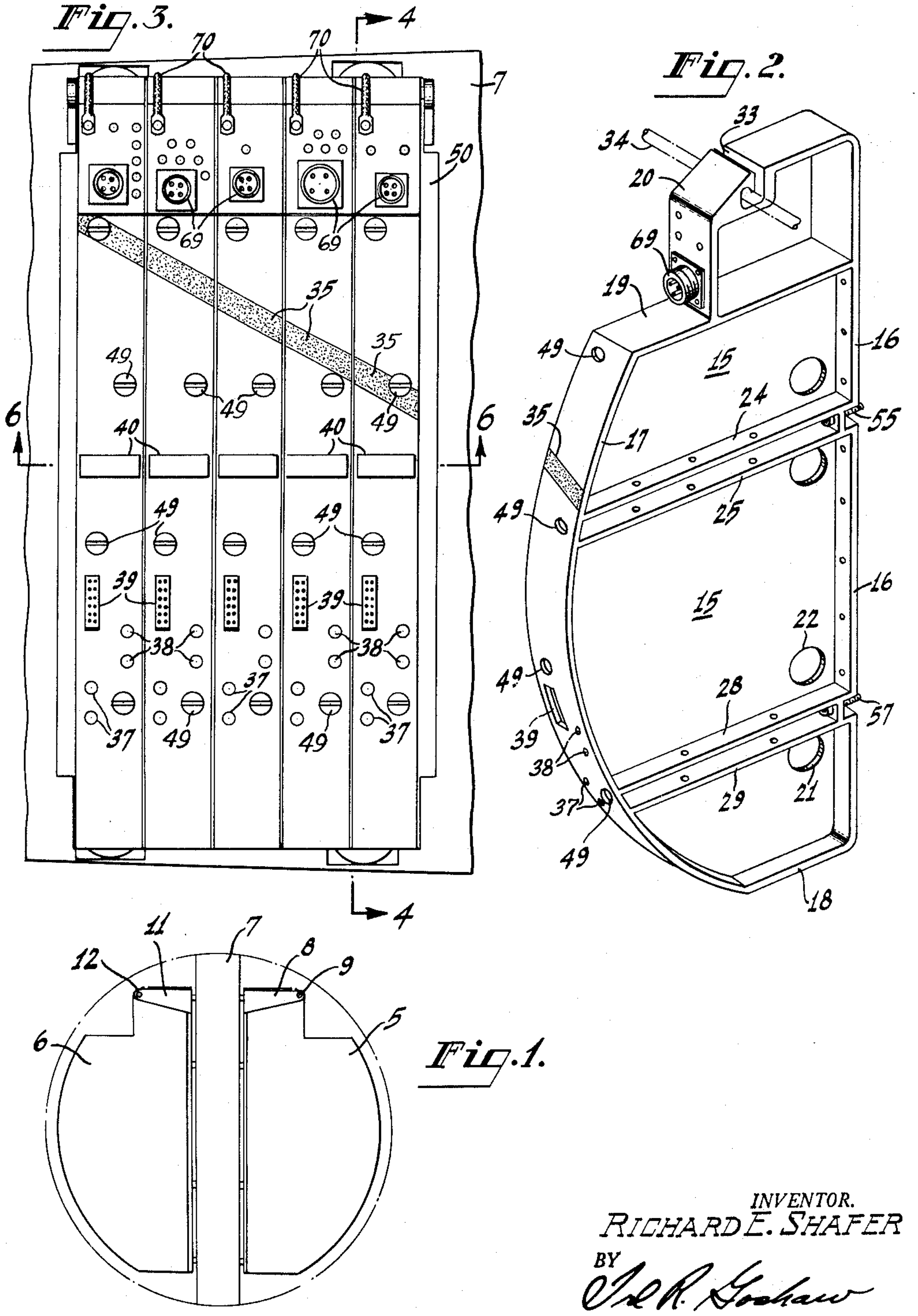
FIG. 1 is an end view of a pair of mounting frames embodying the invention.
FIG. 2 is a perspective view of one of the frames embodying the invention.
FIG. 3 is a front elevational view of a plurality of frames as shown in FIG. 2.

Referring, now, to the drawings in which the same reference numerals identify the same elements, FIG. 1 shows a pair of frames 5 and 6, which may be of aluminum,

2 plastic, brass, or magnesium, mounted on a main support 7, the frame 5 being pivoted on a pin 9 in a bracket 8, and frame 6 being pivoted on a pin 12 in a bracket 11. Each of the frames 5 and 6 and other frames mounted parallel with frames 5 and 6 are of the same construction such as shown in the other figures and will now be described.

Figure 4:
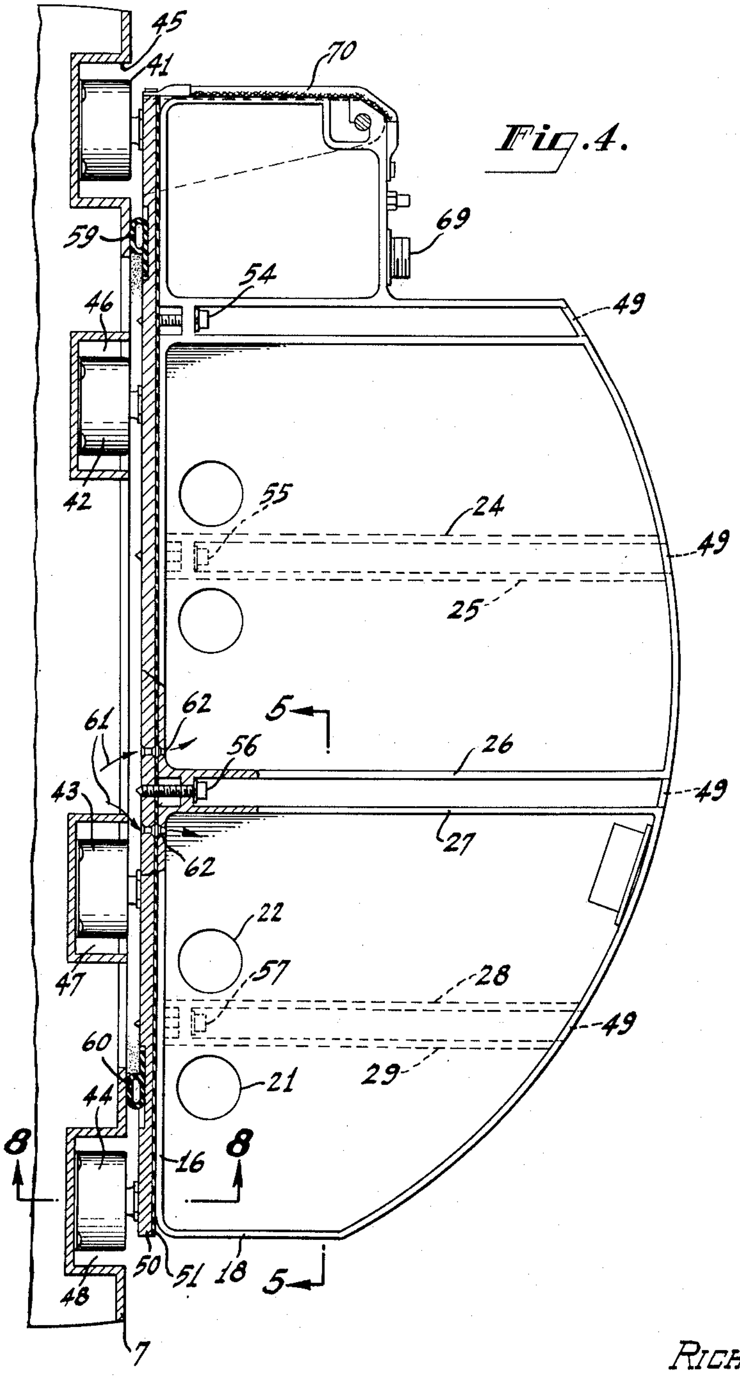
FIG. 4 is a side elevational view of a mounting frame taken along the line 4—4 of FIG. 3.
Figure 5:
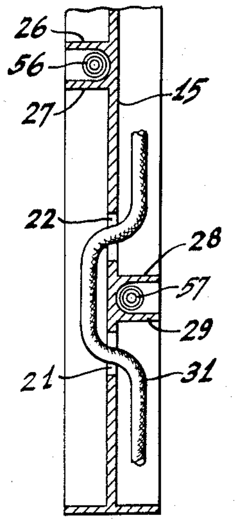
FIG. 5 is a detail view of the frame taken along the line 5—5 of FIG. 4.

Referring to FIG. 2, it will be noted that the frame has a general D configuration with a central web 15, a straight base section 16 with a curved outer rim 17, a lower straight section 18, an upper straight section 19, and a chamber forming section 20. The curved section 17 and straight base section 16 are interconnected by parallel pairs of ribs 24 and 25, 26 and 27, and 28 and 29 (FIG. 4). By reference to FIGS. 4 and 5, it will be noted that ribs 26—27 are on the opposite side of the web 15 from ribs 24—25 and 28—29 and that the several sets of ribs are staggered relative to each other. The reason for staggering these ribs will be apparent from FIG. 5, which shows a cable 31 passing from the lower bay on the right hand side of the web 15 to the upper bay on the right hand side of the web 15 through the left hand bay. The cable passes through holes 21 and 22 in the web. In this manner, all electrical units, including heavy cable, will be positioned within the width of the frame made up of the sections 16, 17, 18, 19, and 20. It will be noted that the chamber formed by section 20 is the full width of the frame and is suitable for mounting electrical elements, such as transformers, which require a greater dimension than that provided between the web 15 and the edges of the frame.

To the web 15 may be mounted printed circuit boards, condensers, resistors, inductances, and tubes in any suitable manner and interconnected by pins or wire passing through small holes in the web 15.

As shown in FIG. 2, a notch 33 in the section 20 accommodates a rod 34 on which a number of the frames may be mounted, as shown in FIG. 3. That is, a group of frames may be pivotally mounted on the rod 34, which may correspond to the pin 9 on one side of the main support 7, as shown at 5 in FIG. 1, and another group of frames, as shown in FIG. 3, may be pivotally mounted on the pin 12 similar to rod 34, as shown at 6 in FIG. 1. The frames may be unhooked from the rods for the removal thereof.

As shown in FIG. 3, the proper replacement of the various frames is assured by a stripe 35 painted at an angle on the sections 17 of the frames. The curved portions 17 of the frames have outlets, such as 37, 38, and 39, for testing the various electrical sections of the circuitry, screw access holes being shown at 49. To identify the circuitry or elements mounted on each frame, labels 40 are provided.

As mentioned above, the above frames should provide the maximum in insulation from vibration, and to provide such insulation, the frames are attached to the equipment mounting support 7 by standard type vibration mountings, such as shown at 41, 42, 43, and 44, in corresponding recesses 45, 46, 47, and 48 of main support 7. The mountings 41, 42, 43, and 44 are attached to a base plate 50 to which the section 16 of each frame is attached. Between the base plate 50 and section 16 is interposed a rubber or plastic gasket 51. Each frame is attached to the base plate 50 by screws 54, 55, 56, and 57, accessible through holes 49. Passing through the base plate 50 and gasket 51 and section 16 are holes 62, these holes conducting air into the bays of the frames for cooling the various elements. To provide a seal at the ends of the frame section 16 are hollow rubber gaskets 59 and 60. Thus, as shown by the arrows 61, air under pressure is forced between the support 7 and base plate 50 and into the space between the gaskets 59 and 60, and thus into the frame bays for cooling the elements therein.

Figure 6:
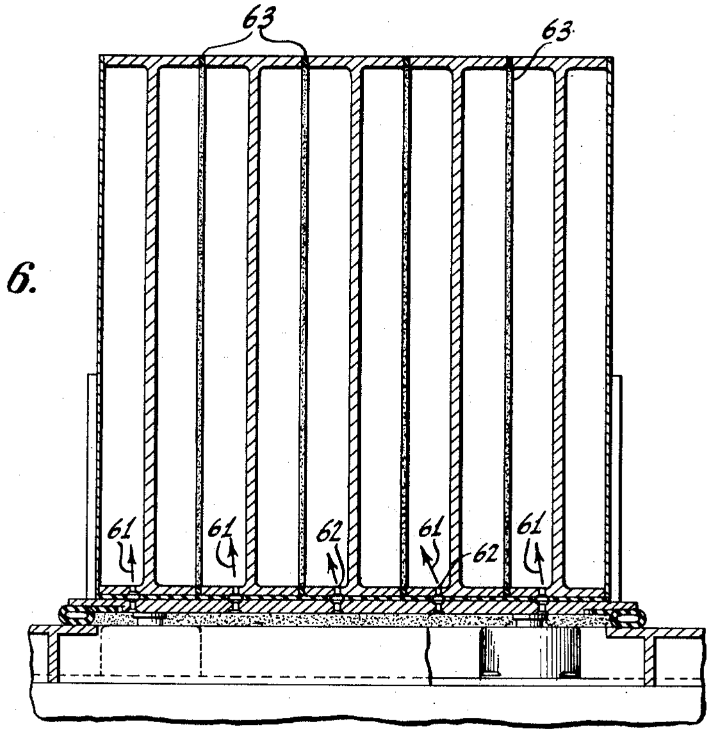
FIG. 6 is a cross-sectional view taken along the lines 6—6 of FIG. 3.

As shown in FIG. 6, the air enters the bays of the frames, as shown by the arrows, and passes out between the edges of the frame. Attached to one edge of each frame and, therefore, positioned between the edges of adjacent frames is a porous gasket such as shown at 63. These gaskets along the edges of sections 17, 18, 19, and 20 have three functions. First, they permit the cooling air to escape; second, they keep foreign particles from entering the bay sections; and, third, they permit greater production tolerances in the width of the frames and the mounting thereof on the mounting plate.

Figure 7:
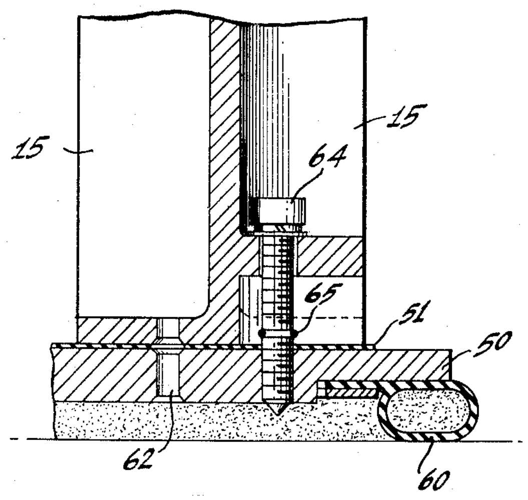
FIG. 7 is a detail cross-sectional view showing the mounting screws for the frames.
Figure 8:
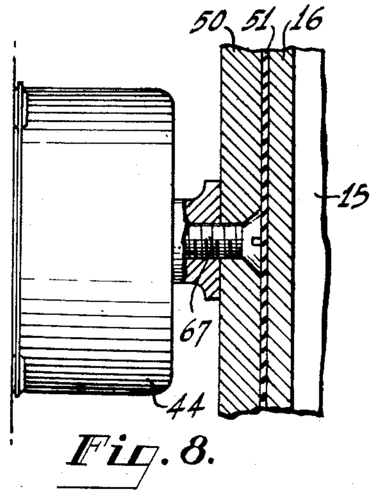
FIG. 8 is a detail view taken along the line 8—8 of FIG. 4.

Referring, now, to FIGS. 7 and 8, these figures illustrate the attachment of a frame to the base plate 50 by a screw 64, corresponding to one or another of the screws 54, 55, 56, and 57 in FIG. 4. On the screw 64 is an O ring 65 which prevents the screw 64 from falling from the frame when detached from the base plate 50. In FIG. 8, the manner of attaching the base plate 50 to the shock mount 44 is shown. This mount utilizes a flat head screw 67 so that the gasket 51 may be fitted thereover.

From the above description, it is realized that a large number of electrical elements may be mounted in the bays of the D frames, all of which may be interconnected within the width of the frames, the elements being subjected to cooling air and the sections being interconnected by a harness attached to plugs 69. To insure proper grounding, straps 70 are attached to the frames and to the base plate or main support. The units are mounted on brackets as shown at 8 and 11 in FIG. 1 and may be easily rotated on the rods 9 and 12, after the screws 54, 55, 56, and 57 are loosened, for inspection and repair without disconnection of the units.

The various elements mounted on the frames are thus easily accessible for tuning or adjustment or replacement, while the entire unit may occupy a minimum of space with the maximum of insulation from vibration and heat.

I claim:

1. A frame for electrically insulating a plurality of electrical units from shock, permitting the cooling thereof and for positioning the maximum number of said units in a circular walled space with maximum accessibility comprising a D-shaped frame having a centrally disposed web between a straight base portion thereof and a curved portion thereof, a plurality of ribs between the straight portion of said frame and the curved portion thereof, certain of said ribs being on one side of said web and others of said ribs being on the other side of said web, said ribs being arranged in staggered relation on the two sides of said web, one edge of said ribs on one side of said web lying in the plane of the side of said frame, said web having openings therein adjacent said ribs, and means providing a compartment attached to one end of said frame of the same width as the width of said frame, a wall of said compartment having a notch therein to accommodate a rod to permit the pivoting of said frame thereon.

2. A frame in accordance with claim 1 in which a base plate is provided together with an insulating gasket, said straight side of said frame being attached to said base plate with said gasket therebetween.

3. A frame in accordance with claim 2 in which a mounting support is provided together with shock mounts interconnecting said base plate and said support.

4. A frame in accordance with claim 3 in which holes are provided through said base plate, said gasket and said straight portion of said frame for conducting air into said frame.

5. A frame in accordance with claim 4 in which a resilient gasket is provided along one outer edge of said frame, said frame being adapted to abut other frames having similar gaskets thereon, said last-named gaskets permitting cooling air in said frames to escape, preventing particles from entering said frames, and providing greater production tolerances.

6. A mounting frame for mounting the maximum number of electrical elements within a circular walled space comprising a D-shaped frame having a centrally disposed web within the straight and curved portions thereof, a plurality of ribs on one side of said web, a second plurality of ribs on the other side of said web arranged in staggered relation with respect to said first named ribs, the outer edges of said ribs lying in the planes of their respective sides of said frame, a rod, and a section formed at one end of said frame to provide a compartment, said section being formed to permit the pivoting of said frame on said rod.

7. A mounting frame in accordance with claim 6 in which said section has a web at one side thereof.

8. A mounting frame in accordance with claim 6 in which a plurality of said frames are pivoted on said rod, flexible gasket means being provided on one outer edge of each of said frames to form an enclosure between said frames, said gasket means permitting cooling air in said frames to escape, preventing particles from entering said frames, and providing greater production tolerances.

9. A mounting frame in accordance with claim 6 in which a support having recesses therein is provided together with shock absorbing means in said recesses, a base plate attached to said shock absorbing means and to said straight portion of said frame, and an insulating gasket between said base plate and said straight portion, said gasket forming a closure through which cooling air is passed to the interior of said frames.

10. A mounting in accordance with claim 9 in which openings are provided through said base plate, gasket and straight portion of said frame for passing air into the interior of said frame.

11. A mounting in accordance with claim 10 in which outlets are provided in the curved portion of said frame to connect electrical elements mounted on said web to electrical elements exteriorly of said frame.

12. A mounting frame for mounting a plurality of electrical components, said frame comprising a web member and a peripheral rim member about said web member, said rim member extending in opposite directions beyond the plane of said web member whereby said web member is spaced from the ends of said rim member, said rim member having a pair of opposed portions, and a plurality of ribs on said web member extending thereacross between said opposed portions of said rim member, certain ones of said ribs being on one side of said web member and certain other ones of said ribs being on the other side of said web member in staggered relation to said first named ribs, said first and second named ribs providing a plurality of overlapping component receiving bays on the opposite sides of said web member.

13. A mounting frame for mounting a plurality of electrical components, said frame comprising a web member and a peripheral rim member about said web member, said rim member extending in opposite directions beyond the plane of said web member whereby said web member is spaced from the ends of said rim member, said rim member having a pair of opposed portions, and a plurality of ribs on said web member extending thereacross between said opposed portions of said rim member, certain ones of said ribs being on one side of said web member and certain other ones of said ribs being on the other side of said web member in staggered relation to said first named ribs, said first and second named ribs providing a plurality of overlapping component receiving bays on the opposite sides of said web member, and said web member having in proximity to at least certain of said ribs a plurality of openings therein through which a flexible conductor can be threaded from one of said bays on one side of said web member to another of said bays on the other side of said web member and thence back to the next adjacent bay on said one side of said web member in order to bypass an intervening rib between said one bay and said next adjacent bay.

14. A mounting frame for mounting a plurality of electrical components, said frame comprising a web member and a peripheral rim member about said web member, said rim member extending in opposite directions beyond the plane of said web member whereby said web member is spaced from the ends of said rim member, said rim member having a pair of opposed portions, a plurality of ribs on said web member extending thereacross between said opposed portions of said rim member, certain ones of said ribs being on one side of said web member and certain other ones of said ribs being on the other side of said web member in staggered relation to said first named ribs, said first and second named ribs providing a plurality of overlapping component receiving bays on the opposite sides of said web member, and means on said rim member for pivotally mounting said mounting frame on a support for swinging movement thereon.

References Cited in the file of this patent

UNITED STATES PATENTS

| | | |
|---|---|---|
| 1,557,001 | Ansingh | Oct. 13, 1925 |
| 1,692,064 | Trogner | Nov. 20, 1928 |
| 1,738,172 | Judson | Dec. 3, 1929 |
| 2,185,562 | Nielsen | Jan. 2, 1940 |
| 2,572,618 | Haury | Oct. 23, 1951 |
| 2,787,735 | K-F Scal | Apr. 2, 1957 |
| 2,802,997 | Branckhurst | Aug. 13, 1957 |
| 2,829,317 | Timmermans | Apr. 1, 1958 |
| 2,836,772 | Wintrode | May 27, 1958 |
| 2,843,806 | O'Neill | July 15, 1958 |
| 2,880,378 | Lindseth | Mar. 31, 1959 |
| 2,942,856 | Woodward | June 28, 1960 |